United States Patent
Kang et al.

(10) Patent No.: US 10,296,304 B2
(45) Date of Patent: May 21, 2019

(54) METHOD AND SYSTEM FOR ANALYZING DATA BASED ON BLOCK

(71) Applicant: NHN Entertainment Corporation, Seongnam-si (KR)

(72) Inventors: Dong Min Kang, Seongnam-si (KR); Young Il Cho, Seongnam-si (KR); Chanwoo Yang, Seongnam-si (KR); Kyeong Won Seo, Seongnam-si (KR); Sol Kim, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 0 days.

(21) Appl. No.: 15/964,127

(22) Filed: Apr. 27, 2018

(65) Prior Publication Data
US 2018/0314499 A1    Nov. 1, 2018

(30) Foreign Application Priority Data

Apr. 28, 2017    (KR) .................. 10-2017-0055403

(51) Int. Cl.
| G06F 8/41 | (2018.01) |
| G06F 8/30 | (2018.01) |
| G06F 8/34 | (2018.01) |
| G06F 8/33 | (2018.01) |

(52) U.S. Cl.
CPC .............. *G06F 8/34* (2013.01); *G06F 8/31* (2013.01); *G06F 8/33* (2013.01); *G06F 8/433* (2013.01)

(58) Field of Classification Search
None
See application file for complete search history.

(56) References Cited

U.S. PATENT DOCUMENTS

| 5,586,020 A  * | 12/1996 | Isozaki ..................... G06F 8/42 717/143 |
| 9,335,911 B1 * | 5/2016 | Elliot ................ G06F 17/30572 |
| 10,025,571 B1 * | 7/2018 | Boulos .................... G06F 8/443 |

(Continued)

FOREIGN PATENT DOCUMENTS

| JP | H11-353164 | 12/1999 |
| JP | 2004-355066 | 12/2004 |

(Continued)

OTHER PUBLICATIONS

Japanese Office Action dated Feb. 26, 2019 issued in Japanese Patent Application No. 2018-078448.

*Primary Examiner* — Isaac T Tecklu
(74) *Attorney, Agent, or Firm* — H.C. Park & Associates, PLC

(57) ABSTRACT

A computer-implemented data analysis method including the steps of: providing a block for each group, in which the blocks are mapped to have different shapes from each other, and the groups are classified based on an attribute of a programming language-based function and instruction; providing a user interface for receiving the block selected by a user; generating a data analysis flow based on a user creation block that is generated when the selected blocks are combined in the user interface; transforming the data analysis flow to a programming language-based data analysis code through a language transform engine; and performing a data analysis based on the transformed data analysis code.

14 Claims, 13 Drawing Sheets

(56) References Cited

U.S. PATENT DOCUMENTS

| | | | |
|---|---|---|---|
| 2006/0230393 A1* | 10/2006 | Doh | G06F 8/43 |
| | | | 717/137 |
| 2008/0159633 A1* | 7/2008 | van Eikeren | G06F 17/211 |
| | | | 382/209 |
| 2010/0042981 A1* | 2/2010 | Dreyer | G06F 8/456 |
| | | | 717/146 |
| 2013/0081002 A1* | 3/2013 | Kalman | G06F 11/3604 |
| | | | 717/132 |
| 2013/0219372 A1* | 8/2013 | Li | G06F 8/443 |
| | | | 717/128 |
| 2015/0121349 A1* | 4/2015 | Abadi | G06F 8/433 |
| | | | 717/132 |
| 2015/0261881 A1* | 9/2015 | Wensel | G06F 17/30958 |
| | | | 707/798 |
| 2016/0350133 A1* | 12/2016 | Imai | G06F 8/33 |
| 2017/0147301 A1* | 5/2017 | Rong | G06F 8/433 |

FOREIGN PATENT DOCUMENTS

| | | |
|---|---|---|
| JP | 2010244110 | 10/2010 |
| JP | 2014-186508 | 10/2014 |
| KR | 10-2015-0069424 | 6/2015 |

\* cited by examiner

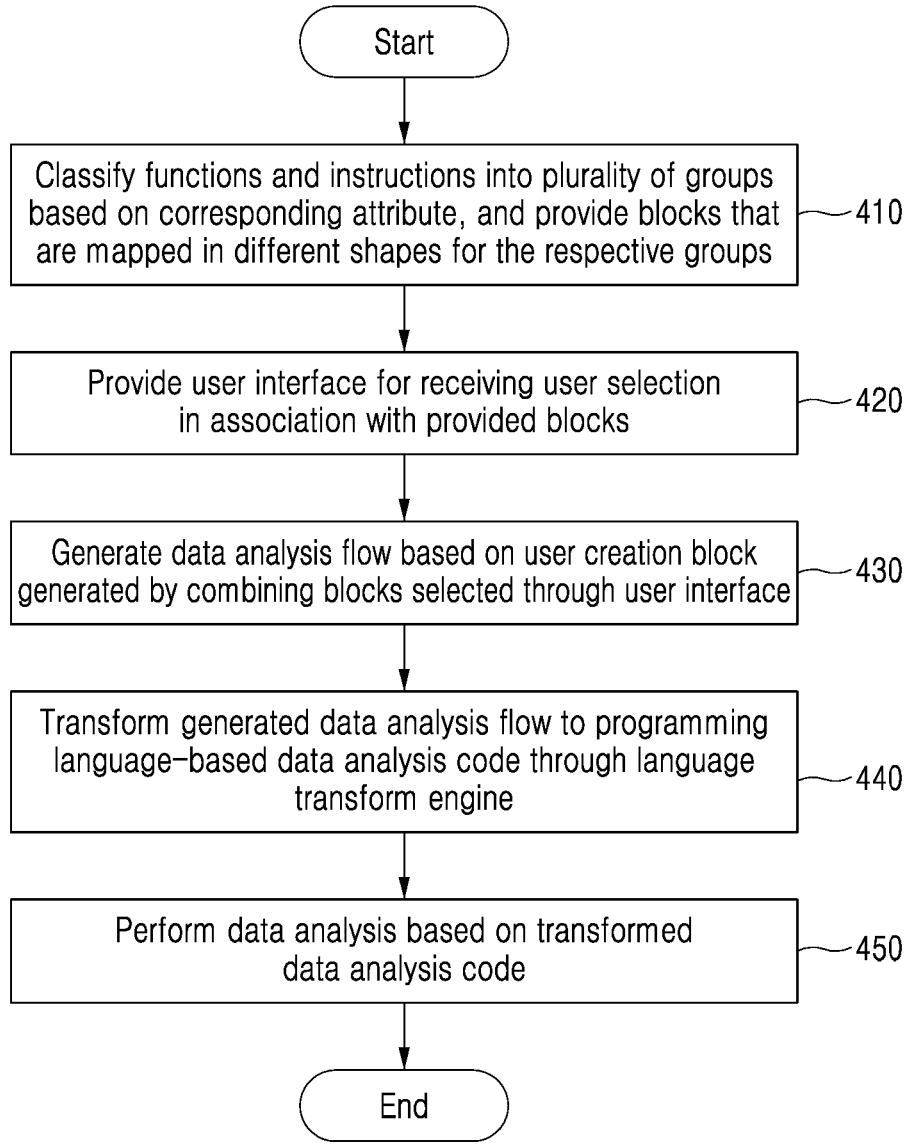

FIG. 7B

- cut(740)

using line divider ( " \t " ) divides column and then, ( 1 ) st column only filters gather
- wc(750)

count number of lines of data

- bc(760)

SUM ▽
  ✓ SUM
    MIN
    MAX
    AVG

- save(770)

result [ PASSED ▽ ] display

FIG. 8B

```
df1, df2 = load_result(sqlContext, result_type = 'fileContent', target_filename = base64.b64

# >>> start 20121
def process_satisfied_20121(dataframe):
  df1 = dataframe
  df1, df2 = filter_line_match_pattern(dataframe = df1, pattern = 'pam_cracklib.so')
  df1, df2 = filter_line_match_pattern(dataframe = df1, pattern = '^password  s/*requisite')
  df1 = mark_resultstring(dataframe = df1)
  df1, df2 = filter_line_match_pattern(dataframe = df1, pattern = 'retry')
  df1, df2 = count_lines(dataframe = df1)
  df1, df2 = decide_by_logical(dataframe = df1, func = 'gt', value = 0, value_type = 'int')

# >>> start 11012
def process_satisfied_11012(dataframe):
  df1 = dataframe
  df1 = score_rule(dataframe = df1, result = True)
  save(dataframe = df1)
process_satisfied_11012(dataframe = df1)
def process_unsatisfied_11012(dataframe):
  df1 = dataframe
  df1 = score_rule(dataframe = df1, result = False)
  save(dataframe = df1)
process_unsatisfied_11012(dataframe = df2)
<<< end 11012 process_satisfied_20121(dataframe = df1)
def process_unsatisfied_20121(dataframe):
  df1 = dataframe
  df1 = score_rule(dataframe = df1, result = True)
  save(dataframe =df1)
process_unsatisfied_20121(dataframe = df2)
# <<< end 20121
```

Data analysis code(830)

METHOD AND SYSTEM FOR ANALYZING DATA BASED ON BLOCK

CROSS-REFERENCE TO RELATED APPLICATION

This application claims the priority from and benefit of Korean Patent Application No. 10-2017-0055403, filed on Apr. 28, 2017, which is hereby incorporated by reference for all purposes as if fully set forth herein.

BACKGROUND

Field

Exemplary embodiments of the invention relate generally to a technology for analyzing secure data based on a programming language.

Discussion of the Background

With the development of high-performance portable devices, such as tablets and smartphones, in addition to personal computers (PCs), an increasingly large number of persons use mobile access to enjoy mobile shopping, browsing, checking e-mails, and the like, in addition to internet access via a desktop PC. With increasing popularity of such portable devices and development of mobile internet technology, large amount of data present on the internet may be collected through a web robot, a web crawler, a spider, and the like. Collected big data may be analyzed and used as desired.

A conventional data analysis system may analyze big data based on a data analysis code that is generated using a programming language, such as Scala, Python, etc. While a user that has learned or familiar with a programming language, such as Scala, Python, etc., may generate a data analysis code, however, a user that has not learned or unfamiliar with the corresponding programming language may not easily generate a data analysis code, and thus, one user may not intuitively understand a data analysis flow generated by another user. Accordingly, it may be difficult to maintain and repair the data analysis flow. As such, there is a need for a data analysis technology that enables a user who has not learned or unfamiliar with a particular programming language, such as Scala, Python, etc., to easily control or modify a data analysis flow of a specific data file.

The above information disclosed in this Background section is only for understanding of the background of the inventive concepts, and, therefore, it may contain information that does not constitute prior art.

SUMMARY

Exemplary embodiments of the invention provide a system and a method capable of assisting a user to easily control or modify a data analysis flow.

Additional features of the inventive concepts will be set forth in the description which follows, and in part will be apparent from the description, or may be learned by practice of the inventive concepts.

An exemplary embodiment of the present invention provides a computer-implemented data analysis method including the steps of: providing a block for each group, in which the blocks are mapped to have different shapes from each other, and the groups are classified based on an attribute of a programming language-based function and instruction; providing a user interface for receiving the block selected by a user; generating a data analysis flow based on a user creation block that is generated when the selected blocks are combined in the user interface; transforming the data analysis flow to a programming language-based data analysis code through a language transform engine; and performing a data analysis based on the transformed data analysis code.

The block may be mapped to one of "source", "transform", "filtering", "gathering", and "sink" groups.

The step of providing the block may include providing attribute information of the block by displaying the attribute information on the corresponding block.

The step of providing the user interface may include providing an information input box on the block, through which an item is selected by the user among a plurality of items predetermined based on attributes of a function and instruction of the corresponding to the block, and storing an indicator associated with the selected item.

The data analysis code may be transformed according to a language selected by the user among multi-paradigm programming languages.

The user creation block may include a combination of blocks dragged and dropped to a second area corresponding to the user interface from the blocks displayed on a first area of a screen.

The data analysis flow may be stored in association with a corresponding data file to be shared with another user that loads the data file.

Another exemplary embodiment of the present invention provides a computer-implemented data analysis system including a block provider configured to provide a block for each group, in which the blocks are mapped to have different shapes from each other, and the groups are classified based on an attribute of a programming language-based function and instruction, and to provide a user interface for receiving the block selected by a user, a flow generator configured to generate a data analysis flow based on a user creation block that is generated when the selected blocks are combined in the user interface, a code transformer configured to transform the data analysis flow to a programming language-based data analysis code through a language transform engine, and a data analyzer configured to perform a data analysis based on the transformed data analysis code.

The block may be mapped to one of "source", "transform", "filtering", "gathering", and "sink" groups.

The block provider may be configured to provide attribute information of the block by displaying the attribute information on the corresponding block.

The block provider may be configured to provide an information input box on the block, through which an item is selected by the user among a plurality of items predetermined based on attributes of a function and instruction of the corresponding to the block, and to store an indicator associated with the selected item.

The data analysis flow may be transformed according to a language selected by the user among multi-paradigm programming languages.

The user creation block may include a combination of blocks dragged and dropped to a second area corresponding to the user interface from the blocks displayed on a first area of a screen.

The data analysis flow may be configured to be stored in association with a corresponding data file to be shared with another user that loads the data file.

Another exemplary embodiment of the present invention provides a non-transitory computer-readable recording medium storing instructions that, when executed by a processor, cause the processor to perform a data analysis method in conjunction with an electronic device configured as a computer, the method including the steps of: providing a block for each group, in which the blocks are mapped to have different shapes from each other, and the groups are classified based on an attribute of a programming language-based function and instruction; providing a user interface for receiving the block selected by a user; generating a data analysis flow based on a user creation block that is generated when the selected blocks are combined in the user interface; transforming the data analysis flow to a programming language-based data analysis code through a language transform engine; and performing a data analysis based on the transformed data analysis code.

The block may be mapped to one of "source", "transform", "filtering", "gathering", and "sink" groups.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 4 is a flowchart illustrating a data analysis method according to an exemplary embodiment.

FIG. 7A and FIG. 7B illustrate blocks having various visualized shapes and items designated for each block according to exemplary embodiments.

FIG. 8A and FIG. 8B illustrate transforming a block-based data analysis flow to a data analysis code according to an exemplary embodiment.

DETAILED DESCRIPTION

Figure 1:
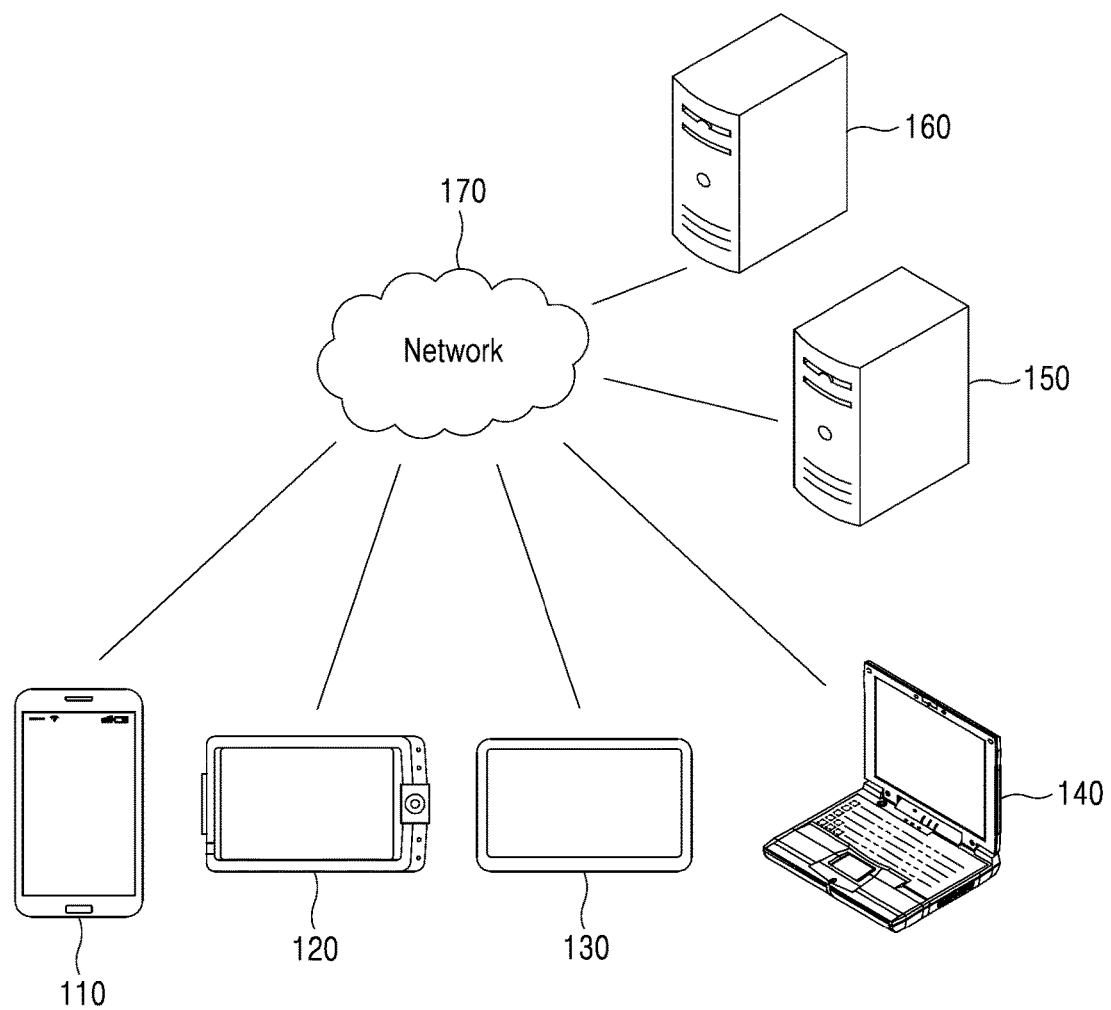
FIG. 1 illustrates a network environment according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a diagram illustrating a network environment according to an exemplary embodiment. Referring to FIG. 1, the network environment may include a plurality of electronic devices 110, 120, 130, and 140, a plurality of servers 150 and 160, and a network 170. FIG. 1 is provided as an example only, and thus, the inventive concepts are not limited to a number of electronic devices and/or a number of servers.

Each of the plurality of electronic devices 110, 120, 130, and 140 may be a fixed terminal or a mobile device that is configured as a computer device. For example, the electronic devices 110, 120, 130, and 140 may be a smartphone, a mobile phone, a navigation, a computer, a laptop computer, a digital broadcasting terminal, a personal digital assistant (PDA), a portable multimedia player (PMP), a tablet personal computer (PC), and the like. The electronic device 110 may communicate with other electronic devices 120, 130, and 140, and/or the servers 150 and 160 over the network 170 via wired or wireless communication.

The inventive concepts are not limited to a particular communication scheme. For example, the communication scheme may include a communication method that uses a near field communication between devices, as well as a communication method using a communication network, for example, a mobile communication network, the wireless internet, a broadcasting network, etc., which may be included in the network 170. The network 170 may include at least one of network topologies that include networks, such as a personal area network (PAN), a local area network (LAN), a campus area network (CAN), a metropolitan area network (MAN), a wide area network (WAN), a broadband network (BBN), an internet, and the like. Also, the network 170 may include at least one of network topologies that include a bus network, a star network, a ring network, a mesh network, a star-bus network, a tree or hierarchical network, and the like. However, the inventive concepts are not limited thereto, and may include various other network topologies.

Each of the servers 150 and 160 may be configured as a computer apparatus or a plurality of computer apparatuses that provide instructions, codes, files, contents, services, and the like, through communication with the electronic devices 110, 120, 130, and 140 over the network 170.

Figure 2:
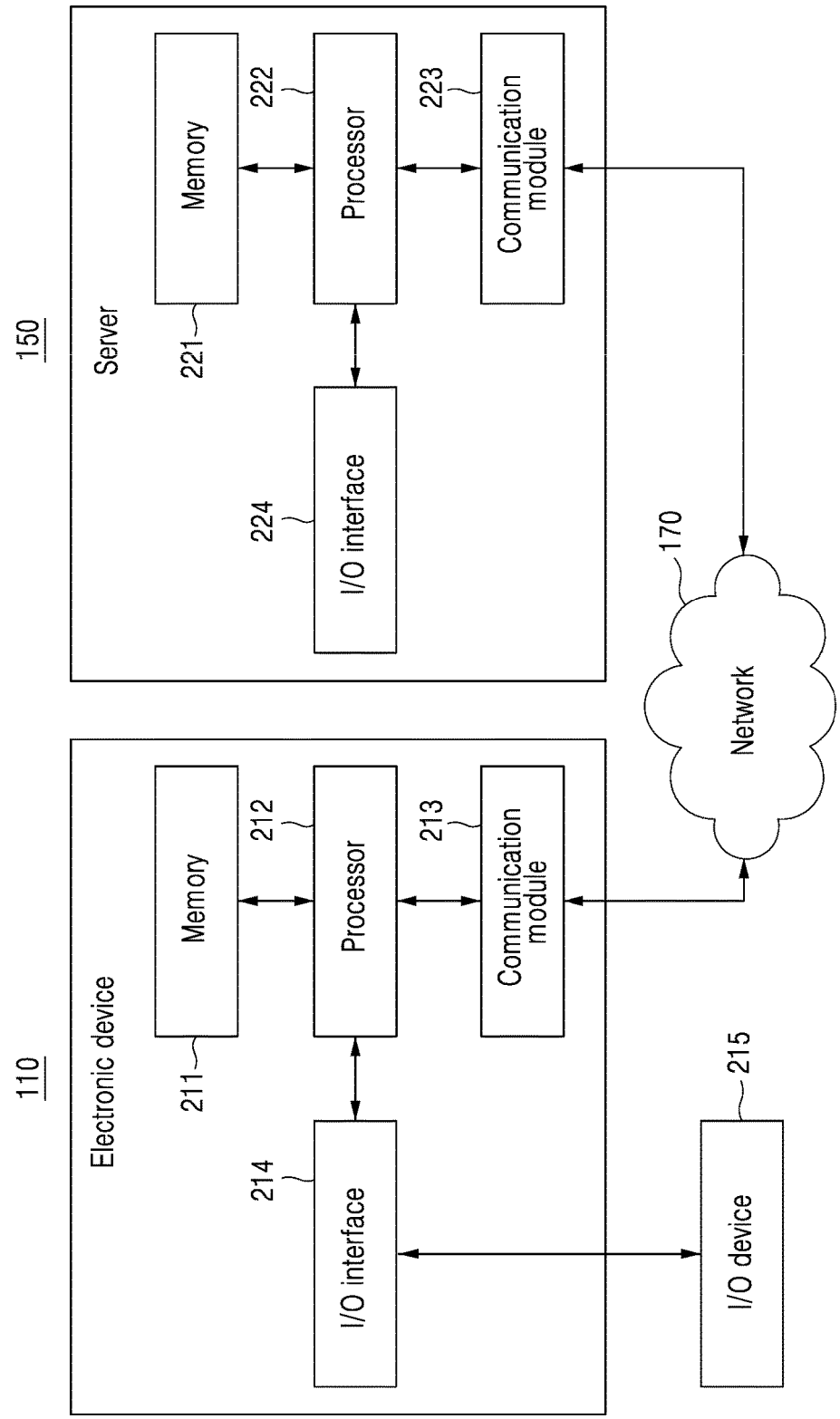
FIG. 2 is a block diagram illustrating a configuration of an electronic device and a server according to an exemplary embodiment.

FIG. 2 is a block diagram illustrating a configuration of an electronic device and a server according to an exemplary embodiment. FIG. 2 illustrates a configuration of the electronic device 110 as an example of a single electronic device and a configuration of the server 150 as an example of a single server. The same or similar components may be applicable to other electronic devices 120, 130, and/or 140, and the server 160.

Referring to FIG. 2, the electronic device 110 may include a memory 211, a processor 212, a communication module 213, and an input/output (I/O) interface 214. The server 150 may include a memory 221, a processor 222, a communication module 223, and an I/O interface 224. The memory 211 and 221 may include a permanent mass storage device, such as random access memory (RAM), read only memory (ROM), and a disk drive, as a non-transitory computer-readable storage medium. Also, an operating system (OS) or at least one program code, for example, a code for an application for block-based data analysis or a browser installed and executed on the electronic device 110, etc., may be stored in the memory 211 and 221. Such software components may be loaded from another non-transitory computer-readable storage medium separate from the memory 211 and 221 using a drive mechanism. The other non-transitory computer-readable storage medium may include, for example, a floppy drive, a disk, a tape, a DVD/CD-ROM drive, a memory card, etc. According to an exemplary embodiment, software components may be loaded to the memory 211 and 221 through the communication module 213 and 223, instead of, or in addition to, the non-transitory computer-readable storage medium. For example, at least one program may be loaded to the memory 211 and 221 based on a program, such as an application installed by files provided over the network 170 from developers or a file distribution system, such as the server 160, which provides an installation file of the application.

The processor 212 and 222 may process computer-readable instructions of a computer program by performing basic arithmetic operations, logic operations, and I/O operations. The computer-readable instructions may be provided from the memory 211 and 221 or the communication module 213 and 223 to the processor 212 and 222. For example, the processor 212 and 222 may execute received instructions in response to the program code stored in the storage device, such as the memory 211 and 222.

The communication module 213 and 223 may provide a communication between the electronic device 110 and the server 150 over the network 170, and a communication with another electronic device, for example, the electronic device 120 or another server 160. For example, the processor 212 of the electronic device 110 may transfer a request, such as a request for a data analysis service, which may be generated based on a program code stored in the storage device, such as the memory 211, to the server 150 over the network 170 under control of the communication module 213. In this manner, a control signal, an instruction, content, a file, etc., provided under the control of the processor 222 of the server 150 may be received at the electronic device 110 through the communication module 213 of the electronic device 110 via the communication module 223 and the network 170. For example, a control signal, an instruction, etc., of the server 150 received through the communication module 213 may be transferred to the processor 212 or the memory 211, and content, a file, etc., may be stored in a storage medium of the electronic device 110.

The I/O interface 214 and 224 may be a device used to interface with an I/O device 215. For example, an input device may include a keyboard, a mouse, etc., and an output device may include a device, such as a display for displaying a communication session of the application. As another example, the I/O interface 214 may be a device to interface with an apparatus having an integrated input/output function, such as a touch screen. In detail, when processing instructions of the computer program loaded to the memory 211, the processor 212 of the electronic device 110 may display a service screen using data provided from the server 150 or the electronic device 120, or may display content on a display through the I/O interface 214.

According to another exemplary embodiment, the electronic device 110 and the server 150 may include a greater or lesser number of components than those shown in FIG. 2. For example, the electronic device 110 may include at least a portion of the I/O device 215, or may further include components, such as a transceiver, a global positioning system (GPS) module, a camera, a variety of sensors, a database, and the like. In detail, if the electronic device 110 is a smartphone, the electronic device 110 may further include various components, for example, an accelerometer sensor, a gyro sensor, a camera, various types of physical buttons, a button using a touch panel, an I/O port, a vibrator for vibration, etc., which are generally included in the smartphone.

A data analysis system according to an exemplary embodiment may be applicable to an apparatus executing an application. That is, a block-based data analysis method according to exemplary embodiments may be applicable to any type of apparatuses, in-house computer servers, and servers that provide a big data or secure data analysis service, or the like that is installed with an application.

For example, the server 150 may receive information associated with a data analysis flow, which is generated by combining blocks selected by a user among blocks displayed on a screen of the electronic device 110, from an application of the electronic device 110. The server 150 may transform the data analysis flow to a data analysis code through a language transform engine based on the received information associated with the data analysis flow to perform data analysis. The server 150 may provide a data analysis result to the electronic device 110 through the application, and control a data analysis result to be displayed on the screen of the electronic device 110.

Hereinafter, a data analysis according to an exemplary embodiment performed on the server 150 by combining blocks and generating a data analysis flow, in response to executing a corresponding program code or application in the electronic device 110 stored with the program code or the application providing a data analysis will be described in more detail.

Figure 3:
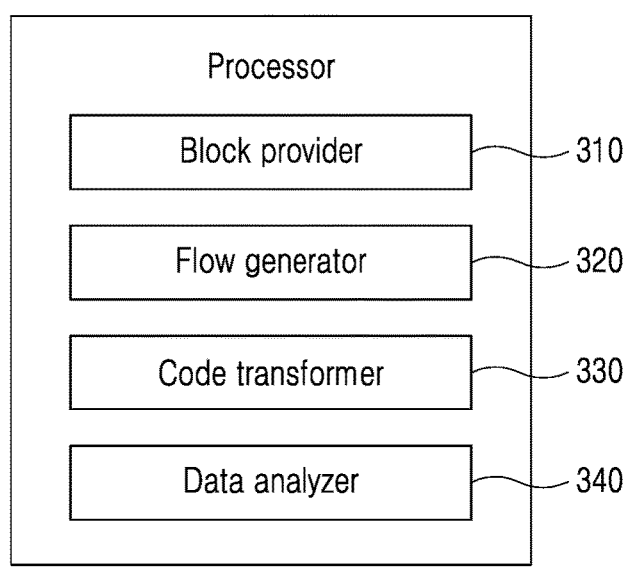
FIG. 3 is a block diagram illustrating a processor of an electronic device according to an exemplary embodiment.

FIG. 3 is a block diagram illustrating a processor of an electronic device according to an exemplary embodiment, and FIG. 4 is a flowchart illustrating a data analysis method according to an exemplary embodiment.

A data analysis system according to an exemplary embodiment may be configured in the electronic device 110. Referring to FIG. 3, the processor 212 included in the electronic device 110 may include a block provider 310, a flow generator 320, a code transformer 330, and a data analyzer 340 as components. The processor 212 and the components of the processor 212 may control the electronic device 110 to perform steps 410 through 450 of the data analysis method illustrated in FIG. 4. Here, the processor 212 and the components of the processor 212 may execute an instruction according to a code of at least one program and a code of an OS included in the memory 211. Here, the components of the processor 212 may be representations of different functions performed by the processor 212 in response to a control instruction provided from the program code stored in the electronic device 110. For example, the code transformer 330 may be a functional representation of an operation performed by the processor 212, such as transforming a user creation block-based data analysis flow to a programming language-based data analysis code in response to the control instruction.

The electronic device 110 may load a program code storing a file of a program for the data analysis method on the memory 211, which may be downloaded from the server 150. For example, when a program or an application for a data analysis service is executed at the electronic device 110, the program code may be loaded to the memory 211 from the file of the program under the control of the OS. In addition, blocks having various predetermined shapes may be displayed on the data analysis system, such as a screen of the electronic device 110, for generating a data analysis flow.

Referring to FIG. 4, in step 410, when a program or an application for a data analysis service is executed, the block provider 310 may provide blocks that are mapped in different shapes for a plurality of groups which are pre-classified according to programming language-based functions and unique function of instructions.

For example, the programming language-based functions and instructions including operators may be classified into one of "loading", "transform", "filtering", "gathering", and "save" groups. Here, "loading" may represent a group that includes an instruction and a function of reading a corresponding file with the memory 211 of the electronic device 110 in order to edit or modify information, such as contents included in the corresponding file among data files. For example, in the programming language "Scala", "load" may be classified into a source group. Each of "transform", "filtering", and "gather" may represent a group that includes an instruction and a function of generating and modifying information of a file to be generated or that has been loaded. "Save" may represent a group that includes an instruction and a function of saving a generated file or a modified file, such as an edited file. For example, in the programming language "Scala", "save" may be classified into a sink group. Blocks predefined in various shapes may be mapped for the respective groups. For example, identifier information of a group and an indicator indicating a function or an instruction that belongs to each group may be matched, stored, and maintained in a database. Here, identifier information of a group and an indicator indicating a block that is mapped to the corresponding group may also be matched, stored, and maintained in the database.

In step 420, the block provider 310 may provide a user interface for receiving a user selection in association with the provided blocks.

For example, the block provider 310 may control blocks that are predefined for each group to be displayed on a first area of the screen. The block provider 310 may control a block selected by the user through the user interface, among the blocks displayed on the first area, to be displayed on a second area predefined on the screen. For example, when a specific group is selected by the user among a plurality of groups, blocks corresponding to the selected specific group may be displayed on the first area. At least one block selected by the user may be moved from the first area and displayed on the second area by, for example, a drag-and-drop scheme.

In step 430, the flow generator 320 may generate a data analysis flow based on a user creation block generated by combining blocks selected through the user interface.

For example, the flow generator 320 may assemble blocks dragged from the first area of the screen and dropped on the second area of the screen in all directions. A block edition function, such as duplicate, delete, etc., may be provided to at least one block among the assembled blocks. In response to selecting display information corresponding to "save", the flow generator 320 may determine that a user creation block is completed and may generate the completed user creation block as a data analysis flow.

In step 440, the code transformer 330 may transform the generated data analysis flow to a programming language-based data analysis code through a language transform engine.

Here, the code transformer 330 may transform the data analysis flow to the data analysis code based on a type of a programming language selected by the user. For example, when the programming language "Scala" is selected by the user, the code transformer 330 may transform a data analysis flow represented in a form of assembled blocks into a Scala based code by utilizing functions, instructions, and operators corresponding to the respective blocks. As another example, when the programming language "Python" is selected by the user, the code transformer 330 may transform a data analysis flow represented in a form of assembled blocks into a Python-based code by utilizing functions, instructions, and operators corresponding to the respective blocks. In addition, the code transformer 330 may transform the data analysis flow to codes based on various programming languages. To perform a code transformation to a selected programming language, a programming language may be selected by the user on an initial screen at a time of executing an application, or generating/reading a file or a program code.

In step 450, the data analyzer 340 may perform a data analysis based on the transformed data analysis code. The data analyzer 340 may provide the result of analysis to the user by displaying the analysis result on the screen, and may store and maintain the analysis result in association with a corresponding file.

Figure 5A:
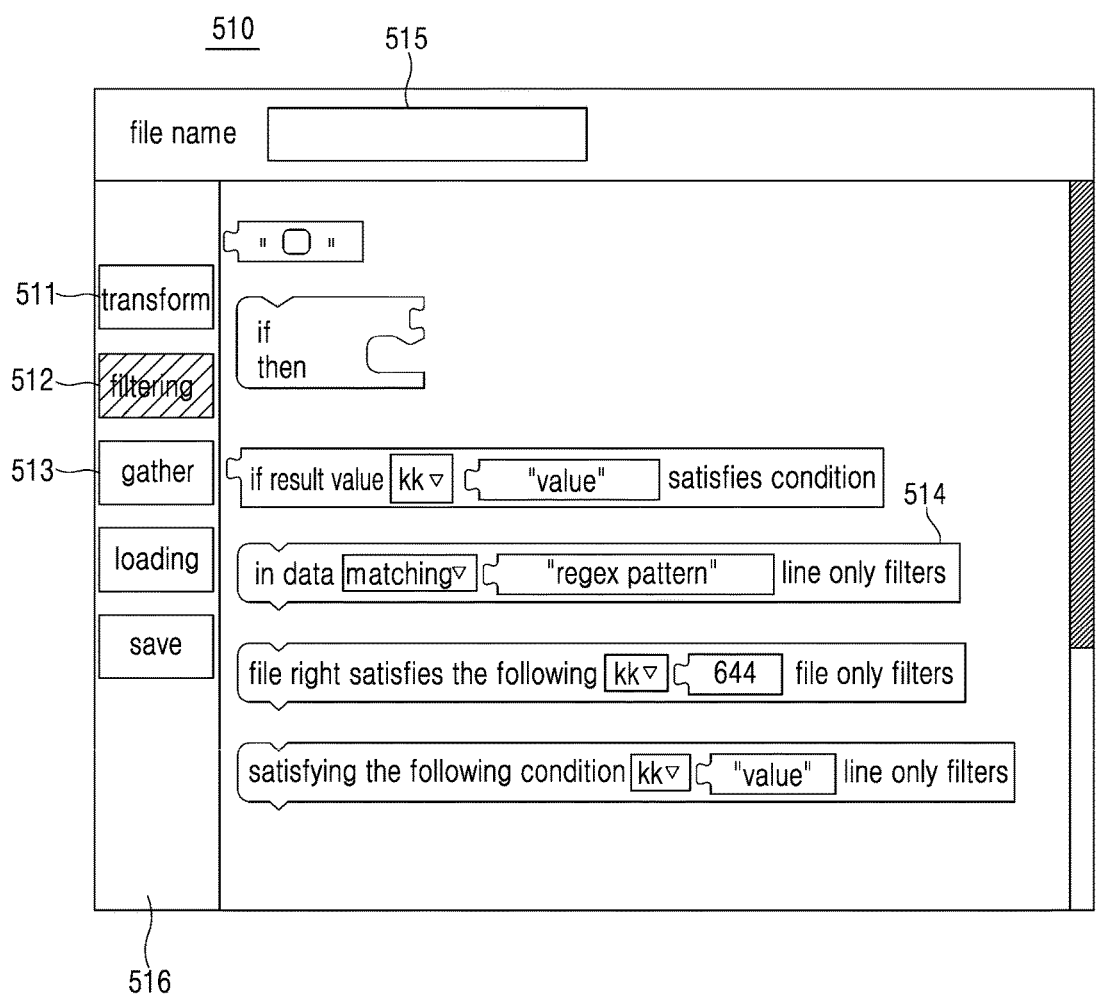
FIG. 5A and FIG. 5B illustrate blocks predefined for each group according to exemplary embodiments.
Figure 5B:
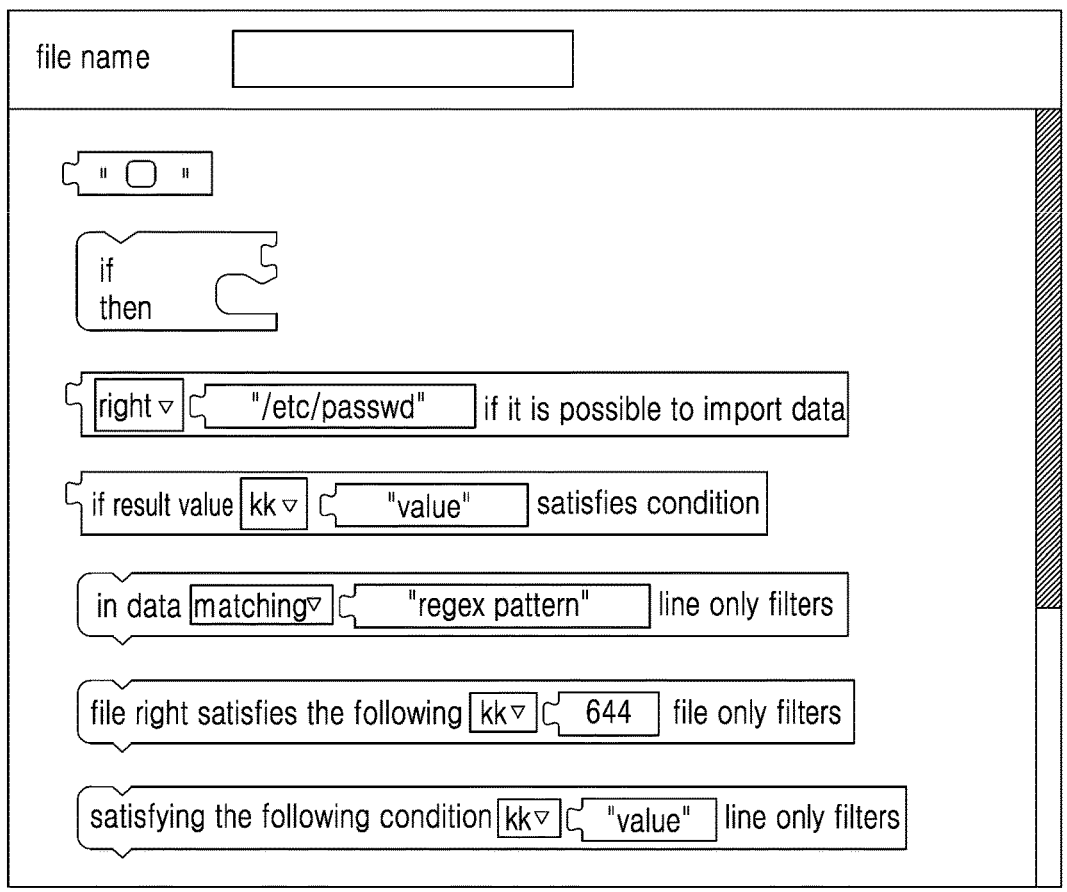

FIGS. 5A and 5B illustrate blocks predefined for each group according to exemplary embodiments.

According to an exemplary embodiment, blocks predefined for each group may be displayed on a screen 510 by each block as shown in FIG. 5A, or all of the blocks may be displayed on a single screen 520 as shown in FIG. 5B. Referring to the screens 510 and 520, an information input box 515 for inputting a name of a file to be generated, or a name of a loaded file may be displayed at an upper end of the screens 510 and 520.

Referring to the screen 510, when display information 511 corresponding to a group "transform" is selected, a block corresponding to a function, an instruction, and an operator that belong to the group "transform" may be displayed. Here, the selected group may be displayed in different color to be distinguished from other unselected groups. When display information 513 corresponding to a group "gather" is selected, a block corresponding to a function, an instruction, and an operator that belong to the group "gather" may be displayed. Likewise, when display information 512 corresponding to a group "filtering" is selected, a block corresponding to a function, an instruction, and an operator that belong to the group "filtering" may be displayed.

For example, a block including a characters string of "if then", a block including a character string of "if then else", and a block including a character string of "grep" (that indicates "general regular expression parser" and is an abbreviation of "globally search files for the occurrence of a string of characters that matches a specific pattern") may be displayed on the screen 510. The character string "if then" may indicate an attribute, that is, a function associated with a function and an instruction corresponding to each block may be displayed on a corresponding block. Each block may include at least one information input box for inputting information, such as a text, a number, etc., and selecting a predefined item based on an attribute of a function and an instruction corresponding to a block. For example, when information corresponding to a specific character string or a specific line is to be filtered based on information included in a loaded file, an information input box 514 for inputting the corresponding character string or line may be inserted and disposed on the block corresponding to "grep."

In addition to the groups "transform", "filtering", and "gather", display information indicating groups "loading" and "save" may be further included in an area 516, on which display information indicating each group is displayed. When displaying information corresponding to the group "loading" is selected, a file, an instruction execution result, a right, etc., may be loaded. When displaying information corresponding to the group "save" is selected, a data analysis flow represented by a user creation block generated by combining blocks may be saved.

Figure 6A:
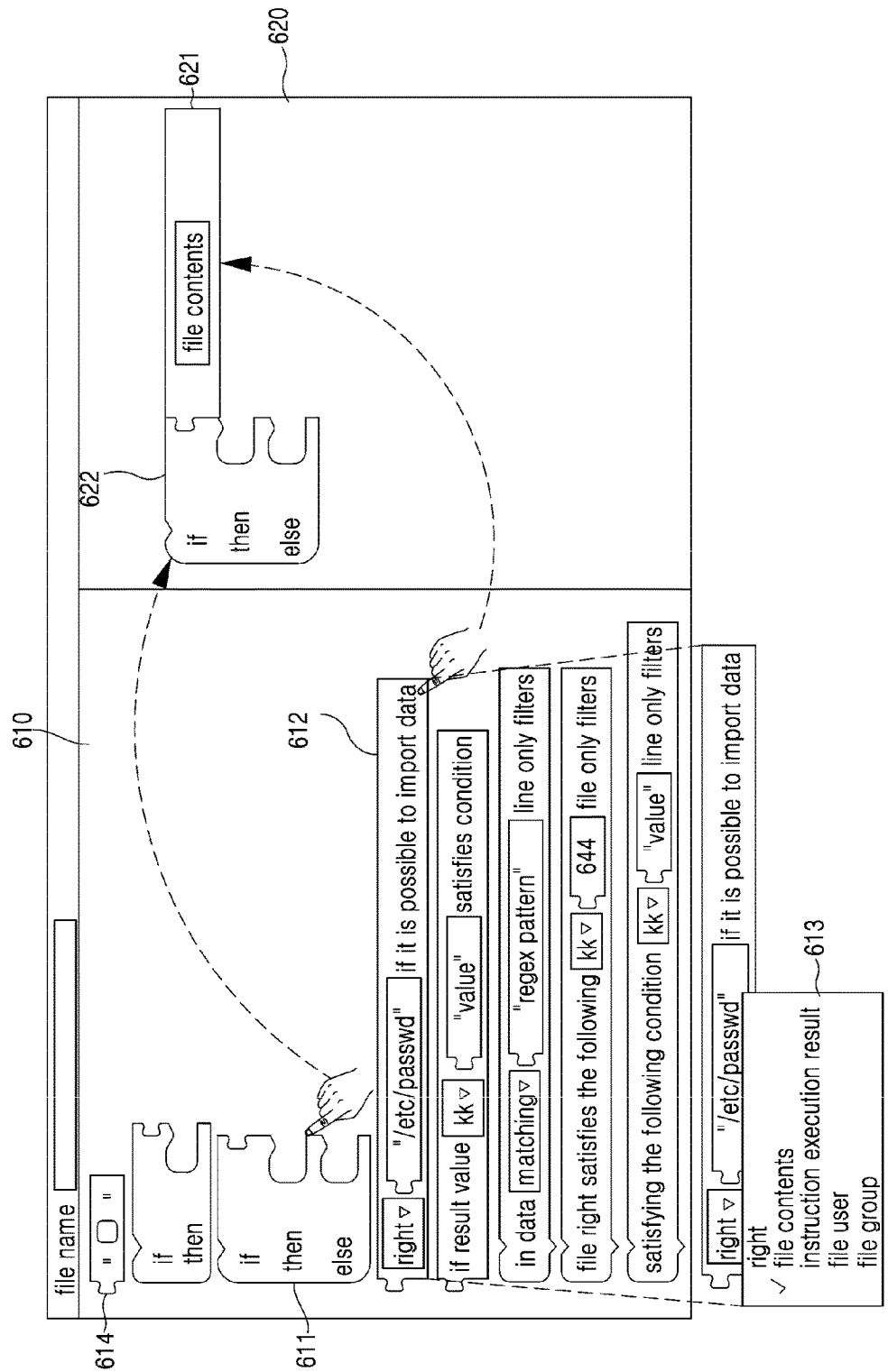
FIG. 6A and FIG. 6B illustrate an operation of generating a data analysis flow by combining blocks according to exemplary embodiments.
Figure 6B:
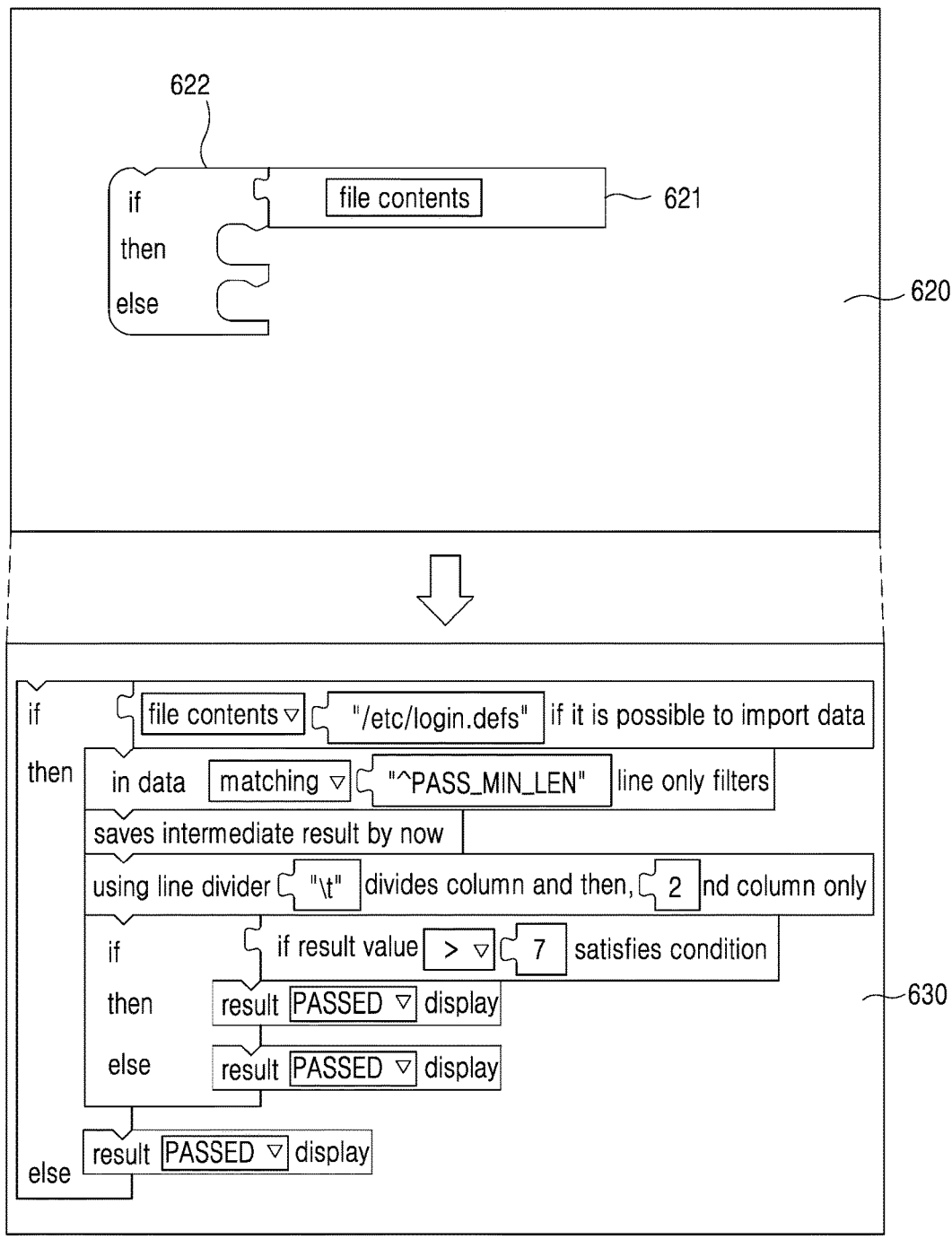

FIGS. 6A and 6B illustrate an operation of generating a data analysis flow by combining blocks according to exemplary embodiments.

Referring to FIG. 6A, a block including a character string indicating a function to be controlled by a user may be selected from the blocks displayed on a first area 610 of a screen, and the selected block may be dragged and dropped from the first area 610 to a second area 620.

For example, to obtain results of whether a value satisfies a specific condition in a specific file, for example, to verify whether a right of data input for secure analysis, such as a log-in account, is correct, a block 612 including a character string of "if it is possible to import 'right'" may be dragged and dropped from the first area 610 to the second area 620. Also, a block 611 including a character string of "if then else" may be dragged and dropped from the first area 610 to the second area 620. Here, since a block 622 is dropped adjacent to a block 621 displayed on the second area 620, the flow generator 320 may control the block 621 and the block 622 to be assembled. "Right" may be set as default and is displayed on an information input box of the block 612 associated with file loading on the first area 610. However, in the case of importing file contents, the item displayed on the information input box may be changed with the file contents, and the file contents may be selected on the information input box. For example, in response to selecting the information input box in which "right" is input, selectable items may be displayed in a form of a list. A single item, for example, "file contents" 613 selected from the selectable items may be displayed on the information input box of the corresponding block. Here, the change of an item may be executed on the first area 610. Once the corresponding block is moved to the second area 620, the item change may be executed on the second area 620. In the case of inputting a specific condition, a specific character string, number, etc., for filtering, a block 614 for inputting a desired character string may be inserted into a block having a different attribute. For example, the block 614 may be inserted into a block corresponding to a function "grep", which is an attribute.

Once a block combination is completed with respect to blocks that are selected by the user from the blocks displayed on the first area 610 and moved on the second area 620, a data analysis flow intuitively showing a connection relationship between combined blocks based on a user creation block may be generated as shown on a screen 630 illustrated in FIG. 6B. Accordingly, even if the user is unfamiliar with a programming language corresponding to a data analysis code of which a loaded file is written, a data analysis flow requesting results about information that the user desires to verify from the corresponding file may be generated.

Figure 7A:
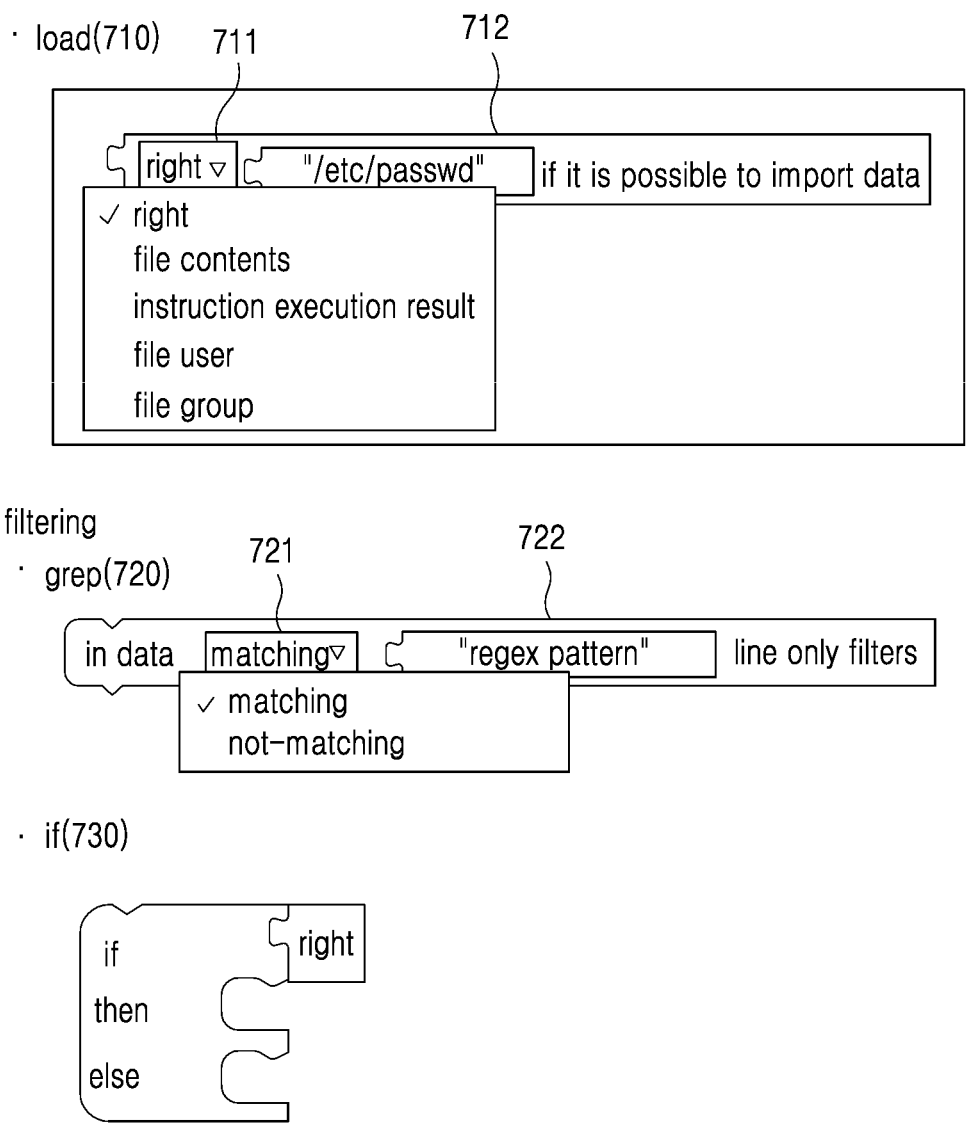

FIGS. 7A and 7B illustrate blocks visualized in various shapes and items designated for each block according to exemplary embodiments.

FIGS. 7A and 7B illustrate an exemplary graphics user interface (GUI) of a block in which a function, an instruction, etc., of a programming language is mapped and blocks mapped for each group to which a unit function belongs.

For example, the respective unit functions may be classified into groups of "source", "transform", "filtering", "gather", "sink", and the like, based on a unique function, that is, an attribute of a corresponding unit function, and a block may be mapped for each group. Here, a block may include an information input box for selecting a specific item among items predefined based on an attribute of a function, and an instruction corresponding the block or inputting a condition, and may include a character string indicating a function performed by the corresponding block.

For example, unit functions may include "load" 710, "grep" 720, "if" 730, "cut" 740, "wc" 750, "bc" 760, "save" 770, and the like. The following Table 1 may represent unit functions and groups to which the corresponding functions belong, respectively.

TABLE 1

| Group (classification) | Unit function | Attribute (description) |
|---|---|---|
| source | load | read data (import) |
| transform | sed | replace a word of sentence |
| transform | sort | sort a plurality of sentences |
| filtering | cut | select a specific column |
| filtering | grep, if | select data based on a pattern or a value |
| gather | wc/bc | acquire a value of line/column (sum, max, min, avg) |
| sink | save | save data |

Referring to FIGS. 7A and 7B, a plurality of items associated with an attribute "import" may be predefined for the function "load" that belongs to the group "source". For example, items "right", "file contents", "instruction execution result", "file user", and "file group" may be pre-matched to identifier information of the block 710 corresponding to the unit function "load." Here, the item "right" may be predefined as a default of the block corresponding to the unit function "load" 710, and is displayed on an information input box of the block displayed on a first area. In response to selecting the information input box to change the item, the remaining items, for example, "file contents", "instruction execution result", "file user", and "file group," as well as the item "right" may be provided in a list form. In this case, an item selected from the list may be displayed on an information input box 711 inserted within the block. Here, a block 712 for inputting "file name", "file user", etc., for example, may be inserted into the block. A character string of "if it is possible to import data" corresponding to a unique function, that is, an attribute of the group "load" 710 may be displayed on the corresponding block.

The unit functions, "grep", "if", "cut", etc., may belong to the group "filtering". A plurality of items associated with an attribute of searching a file for a specific character string may be predefined for the unit function "grep". For example, items "matching", "not-matching", etc., may be pre-matched to identifier information of the block 720 corresponding to the unit function "grep." Here, an information input box 721 for selecting an item and an information input box 722 for inputting a "matching" or "not-matching" specific character string may be inserted and displayed on the block 720.

The unit functions, "wc", "bc", etc., may belong to the group "gather". In the block 760 corresponding to the unit function "bc", operators, for example, SUM, MIN, MAX, and AVG, associated with a unique function executed by the function "bc" may be predefined as items.

The unit function "save" may belong to the group "save". The block 770 corresponding to the unit function "save" may be used to save and display results of an operator executed on the data file read, that is, imported through the group "source" based on the groups "transform", "filtering", and/or "gather".

Once a single combination set of one of the groups "transform", "filtering", and "gather", the group "source", and the group "sink" is completed, the completed user creation block may be generated as a data analysis flow.

Figure 8A:
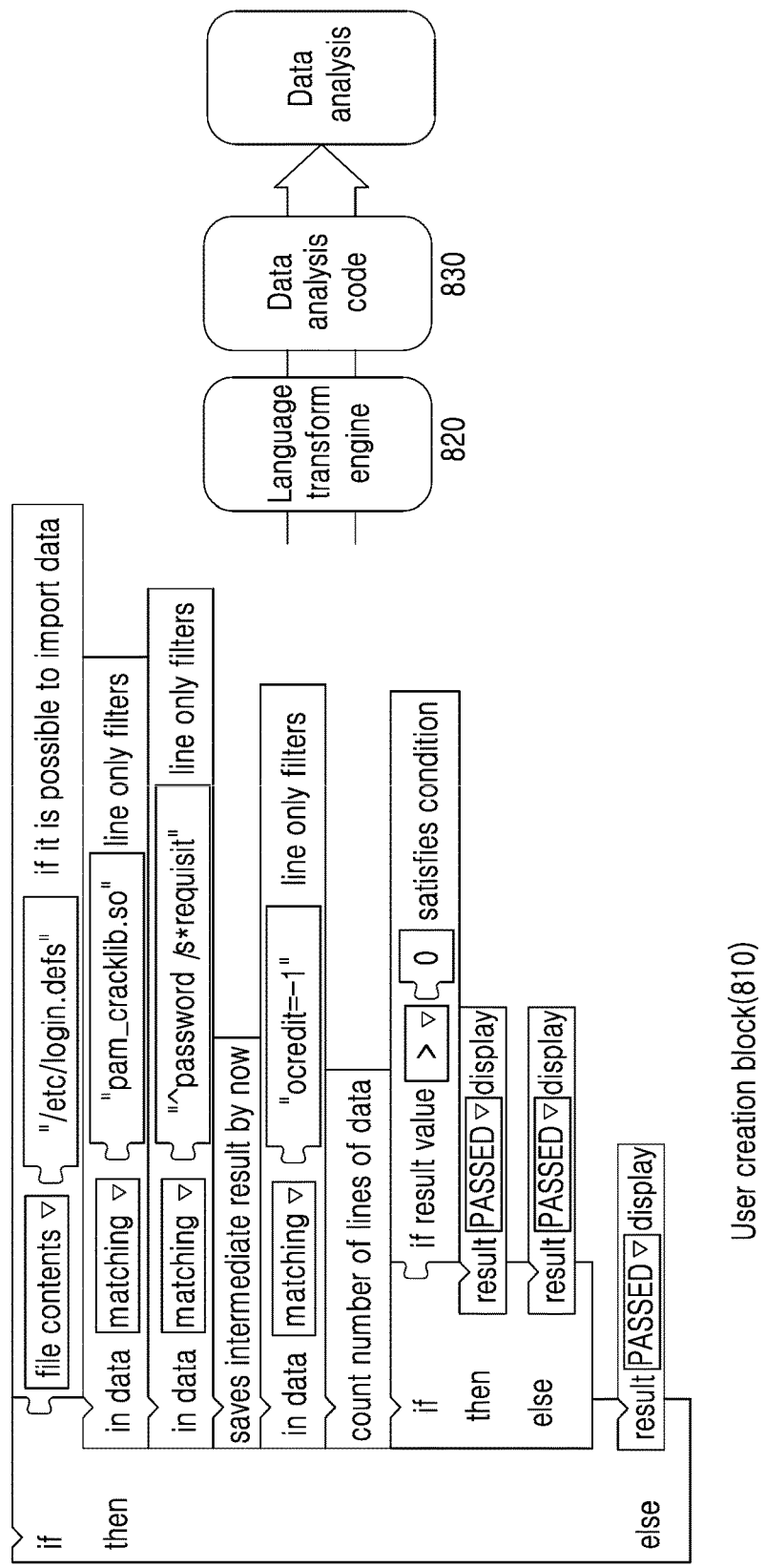

FIG. 8A illustrates transforming a block-based data analysis flow to a data analysis code according to an exemplary embodiment.

Referring to FIG. 8A, once a user creation block 810 is completed by combining blocks, a user creation block-based data analysis flow may be transformed to a data analysis code 830 interpretable with a programming language used to perform a data analysis through a language transform engine 820. For example, a different shape and/or color may be designated for each of the blocks based on an attribute of a function and an instruction indicated by a corresponding block. The code transformer 330 of FIG. 3 may determine functions and instructions indicated by horizontally and vertically connected blocks based on blocks corresponding to groups "source" and "sink" from the user creation block, in which the plurality of blocks is combined through the language transform engine 820, extract an item and a condition designated for each block, and generate the data analysis code 830 illustrated in FIG. 8B. An analysis result performed based on the data analysis code 830 may be displayed on a screen, and may be matched to the corresponding file and data analysis flow and be stored in a storage. The data analysis flow may be shared with other users.

Figure 9:
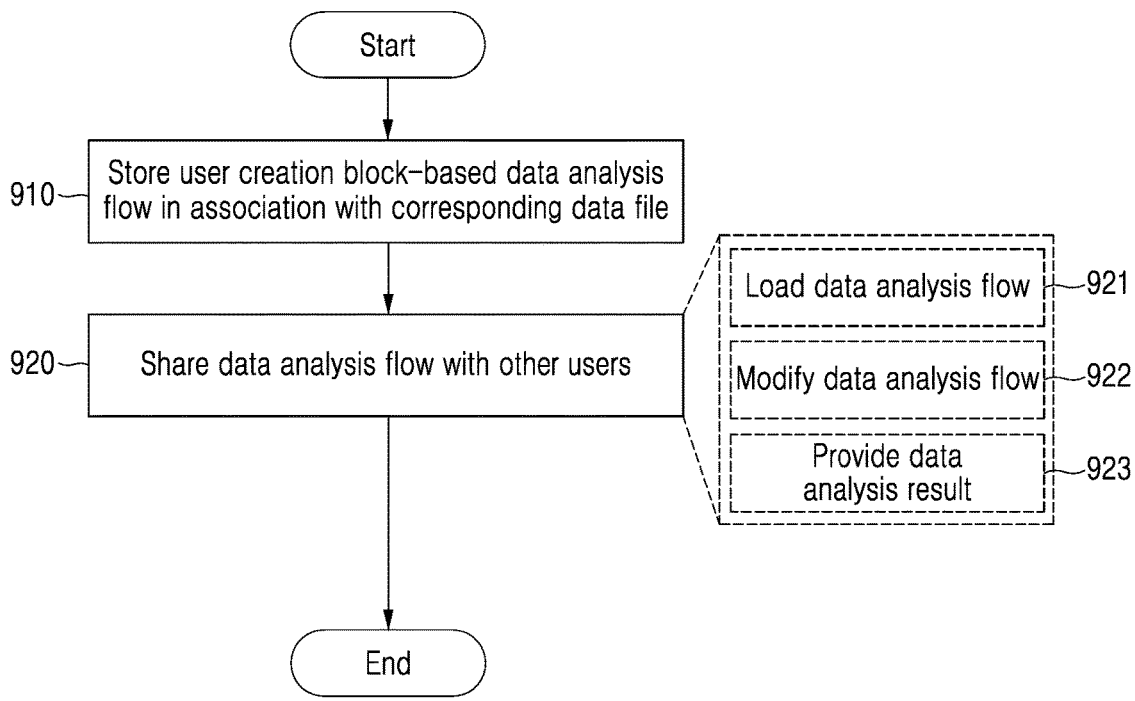
FIG. 9 is a flowchart illustrating an operation of sharing a data analysis flow with another user according to an exemplary embodiment.

FIG. 9 is a flowchart illustrating an operation of sharing a data analysis flow with another user according to an exemplary embodiment.

Referring to FIG. 9, at step 910, the data analyzer 340 may store and maintain a user creation block-based data analysis flow in association with a corresponding data file. For example, a name of a loaded data file and a name of a generated block file may be matched and stored.

In step 920, the generated data analysis flow may be shared with other users over a network.

In step 921, the data analysis flow may be retrieved using a name of a block file and displayed on a screen. For example, a data analysis flow loaded on a screen of an electronic device of another user may be displayed in a form of the user creation block 810 shown in FIG. 8A, in which blocks are combined.

In step 922, although the other user is unfamiliar with a programming language used for a data analysis of the data analysis flow, the other user may modify the data analysis flow by adding or deleting a block to or from the loaded data analysis flow, or by changing a condition.

For example, if a condition is added to the data analysis flow corresponding to the user creation block 810, that is, if a character string matching file contents is added, the added condition may be applied by adding a block related to "grep" from a first area to a corresponding portion of a second area, or by duplicating a block related to "grep" on the second area and adding the duplicated block to the corresponding portion and inputting a character string in the added block, which may generate a user creation block for a data analysis.

As another example, if a condition associated with a result value is to be modified, a corresponding data analysis flow may be modified by inputting a condition value to be modified into an information input box associated with the result value in the data analysis flow corresponding to the loaded user creation block 810. The data analysis flow stored in association with the corresponding file may be updated with the modified data analysis flow.

In step 923, the modified data analysis flow may be transformed to a data analysis code through a language transform engine. A data analysis result performed based on the transformed data analysis code may be displayed on the screen.

According to exemplary embodiments, since a data analysis flow generated by combining blocks is stored and shared in association with a corresponding file, a member of a collaboration team associated with the corresponding file may easily modify the data analysis flow although the member is unfamiliar with a corresponding programming language.

The systems or apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software also may be distributed over network coupled computer systems so that the software is stored and executed in a distributed fashion. The software and data may be stored by one or more computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tapes; optical media such as CD-ROM discs, and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

According to exemplary embodiments, since a data analysis flow is represented in blocks having predetermined various shapes, even a user having not learned or unfamiliar with a particular programming language, such as Scala, Python, a structured query language (SQL), etc., may easily generate a data analysis flow that the user desires to control or modify in association with a specific data file.

Also, according to exemplary embodiments, since a data analysis flow generated by another user is provided in a form of various blocks of different combined with one another, even a user unfamiliar with a corresponding programming language may intuitively understand a meaning of the data analysis flow. For example, by representing a data analysis flow about a data file being shared for collaboration between different teams in a local network, such as a company security analysis and the like, the data file may be easily edited and controlled when the different blocks are assembled as described above.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A computer-implemented data analysis method comprising:
    providing a block for each group, wherein the blocks are mapped to have different shapes from each other, and the groups are classified based on an attribute of a programming language-based function and instruction;
    providing a user interface for receiving the block selected by a user;
    generating a data analysis flow based on a user creation block that is generated when the selected blocks are combined in the user interface;
    transforming the data analysis flow to a programming language-based data analysis code through a language transform engine; and
    performing a data analysis based on the transformed data analysis code, wherein the data analysis code is transformed according to a language selected by the user among multi-paradigm programming languages.

2. The method of claim 1, wherein the block is mapped to one of "source", "transform", "filtering", "gathering", and "sink" groups.

3. The method of claim 1, wherein providing the block comprises providing attribute information of the block by displaying the attribute information on the corresponding block.

4. The method of claim 1, wherein providing the user interface comprises:
    providing an information input box on the block, through which an item is selected by the user among a plurality of items predetermined based on attributes of a function and instruction of the corresponding to the block; and
    storing an indicator associated with the selected item.

5. The method of claim 1, wherein the user creation block comprises a combination of blocks dragged and dropped to a second area corresponding to the user interface from the blocks displayed on a first area of a screen.

6. The method of claim 1, wherein the data analysis flow is stored in association with a corresponding data file to be shared with another user that loads the data file.

7. A computer-implemented data analysis system comprising:
    a microprocessor;
    a memory storing microprocessor executable instructions, that when executed by the microprocessor causes the system to: provide a block for each group, wherein the blocks are mapped to have different shapes from each other, and the groups are classified based on an attribute of a programming language-based function and instruction, and to provide a user interface for receiving the block selected by a user;
    generate a data analysis flow based on a user creation block that is generated when the selected blocks are combined in the user interface;
    transform the data analysis flow to a programming language-based data analysis code through a language transform engine; and
    perform a data analysis based on the transformed data analysis code, wherein the data analysis code is transformed according to a language selected by the user among multi-paradigm programming languages.

8. The data analysis system of claim 7, wherein the block is mapped to one of "source", "transform", "filtering", "gathering", and "sink" groups.

9. The data analysis system of claim 7, wherein the block provider is configured to provide attribute information of the block by displaying the attribute information on the corresponding block.

10. The data analysis system of claim 7, wherein the block provider is configured to provide an information input box on the block, through which an item is selected by the user among a plurality of items predetermined based on attributes of a function and instruction of the corresponding to the block, and to store an indicator associated with the selected item.

11. The data analysis system of claim 7, wherein the user creation block comprises a combination of blocks dragged and dropped to a second area corresponding to the user interface from the blocks displayed on a first area of a screen.

12. The data analysis system of claim 7, wherein the data analysis flow is configured to be stored in association with a corresponding data file to be shared with another user that loads the data file.

13. A non-transitory computer-readable recording medium storing instructions that, when executed by a processor, cause the processor to perform a data analysis method in conjunction with an electronic device configured as a computer, the method comprising:
    providing a block for each group, wherein the blocks are mapped to have different shapes from each other, and the groups are classified based on an attribute of a programming language-based function and instruction;
    providing a user interface for receiving the block selected by a user;
    generating a data analysis flow based on a user creation block that is generated when the selected blocks are combined in the user interface;
    transforming the data analysis flow to a programming language-based data analysis code through a language transform engine; and
    performing a data analysis based on the transformed data analysis code, wherein the data analysis code is transformed according to a language selected by the user among multi-paradigm programming languages.

14. The non-transitory computer-readable recording medium of claim 13, wherein the block is mapped to one of "source", "transform", "filtering", "gathering", and "sink" groups.

* * * * *